(12) United States Patent
Prince

(10) Patent No.: US 8,904,490 B2
(45) Date of Patent: *Dec. 2, 2014

(54) METHOD AND APPARATUS FOR A NON-REVEALING DO-NOT-CONTACT LIST SYSTEM

(75) Inventor: Matthew B. Prince, San Francisco, CA (US)

(73) Assignee: Unspam, LLC, Park City, UT (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/104,931

(22) Filed: May 10, 2011

(65) Prior Publication Data

US 2011/0289321 A1 Nov. 24, 2011

Related U.S. Application Data

(62) Division of application No. 12/259,941, filed on Oct. 28, 2008, now Pat. No. 7,941,842, which is a division of application No. 10/671,119, filed on Sep. 24, 2003, now Pat. No. 7,461,263.

(60) Provisional application No. 60/442,273, filed on Jan. 23, 2003.

(51) Int. Cl.
- *G06F 21/20* (2006.01)
- *G06F 15/16* (2006.01)
- *H04M 3/38* (2006.01)
- *H04L 12/58* (2006.01)

(52) U.S. Cl.
CPC .............. *H04L 12/585* (2013.01); *H04M 3/38* (2013.01); *H04L 51/12* (2013.01)
USPC .................. 726/4; 726/14; 713/182; 713/189; 709/206; 707/757; 707/781

(58) Field of Classification Search
CPC ..... H04L 12/583; H04L 12/585; H04L 51/12; H04L 63/0421; H04L 63/0428
USPC ................ 705/14.4, 14.47, 26.42, 50, 51, 67; 726/1, 2, 11, 14, 4; 709/205, 206, 224, 709/229; 713/168, 182; 707/736, 757, 781, 707/802
See application file for complete search history.

(56) References Cited

U.S. PATENT DOCUMENTS

| | | | |
|---|---|---|---|
| 5,963,646 | A | 10/1999 | Fielder et al. |
| 6,130,937 | A | 10/2000 | Fotta |

(Continued)

FOREIGN PATENT DOCUMENTS

| | | | | |
|---|---|---|---|---|
| WO | 01/18631 | A1 | 3/2001 | |
| WO | WO 01/18631 | A1 * | 3/2001 | ................ G06F 1/00 |

OTHER PUBLICATIONS

Shane Hird, Technical Solutions for controlling Spam, Proceedings of Auug, 2002, pp. 1-17.*

(Continued)

*Primary Examiner* — David García Cervetti
*Assistant Examiner* — Shanto M Abedin
(74) *Attorney, Agent, or Firm* — Blakely Sokoloff Taylor & Zafman, LLP

(57) ABSTRACT

A method and apparatus for a non-revealing do-not-contact list system in which a do-not-contact list of one-way hashed consumer contact information is provided to a set of one or more entities. The set of entities determine whether certain consumers wish to be contacted with the do-not-contact list without discovering actual consumer contact information.

13 Claims, 12 Drawing Sheets

(56) References Cited

U.S. PATENT DOCUMENTS

| | | |
|---|---|---|
| 6,321,267 B1 | 11/2001 | Donaldson |
| 6,330,317 B1 | 12/2001 | Garfinkel |
| 6,397,224 B1* | 5/2002 | Zubeldia et al. ............... 1/1 |
| 6,615,348 B1 | 9/2003 | Gibbs |
| 6,868,498 B1 | 3/2005 | Katsikas |
| 7,007,068 B2 | 2/2006 | Morkel |
| 7,099,444 B1 | 8/2006 | Russell |
| 7,117,358 B2 | 10/2006 | Bandini et al. |
| 7,133,898 B1 | 11/2006 | Malik |
| 7,158,630 B2 | 1/2007 | Fotta et al. |
| 7,162,738 B2 | 1/2007 | Dickinson et al. |
| 7,174,453 B2 | 2/2007 | Lu |
| 7,305,445 B2 | 12/2007 | Singh et al. |
| 7,389,413 B2 | 6/2008 | Bandini et al. |
| 7,444,380 B1 | 10/2008 | Diamond |
| 7,461,263 B2 | 12/2008 | Prince |
| 2002/0004900 A1* | 1/2002 | Patel ............... 713/155 |
| 2002/0052921 A1* | 5/2002 | Morkel ............ 709/206 |
| 2002/0059385 A1* | 5/2002 | Lin ................. 709/206 |
| 2002/0069116 A1* | 6/2002 | Ohashi et al. ......... 705/26 |
| 2002/0111920 A1* | 8/2002 | Tresser ............. 705/74 |
| 2002/0143632 A1* | 10/2002 | Walter et al. ......... 705/14 |
| 2002/0147846 A1 | 10/2002 | Oizumi |
| 2002/0198786 A1* | 12/2002 | Tripp et al. .......... 705/26 |
| 2003/0004787 A1* | 1/2003 | Tripp et al. .......... 705/10 |
| 2003/0009698 A1 | 1/2003 | Lindeman et al. |
| 2003/0212566 A1* | 11/2003 | Fergusson et al. ......... 705/1 |
| 2003/0225841 A1 | 12/2003 | Song et al. |
| 2004/0024823 A1 | 2/2004 | Del Monte |
| 2004/0054887 A1 | 3/2004 | Paulsen et al. |
| 2004/0073617 A1 | 4/2004 | Milliken et al. |
| 2004/0117451 A1 | 6/2004 | Chung |
| 2005/0074114 A1* | 4/2005 | Fotta et al. ............ 379/266.08 |
| 2005/0246344 A1 | 11/2005 | Keller et al. |

OTHER PUBLICATIONS

Livingston, Ben, Possible modifications to Washington, "anti-spam" law, Internet Newsgroup, Jan. 31, 2002, 2 pages.*
Eugene Volokh, The Volokh Conspiracy, http://volokh.com/2003_06_15_volokh_archive.html, Jun. 2003, pp. 1-5.
Declan McCullagh, "Bill Would Let Spamees Sue Spammers," http://www.news.com/2102-1028_3-1016779.html, Jun. 2003, pp. 1-3.
News Report, "FTC Launches Do Not Call Registry", http://www.govtech.com/gt/print_article.php?id=58555, Jul. 2003, pp. 1.
FTC, "National Do not Email Registry A report to Congress", Jun. 2004, pp. 1-60.
Saul Hansell, "Technology; The Bandwagon to Fight Spam Hits a Bump", nytimes.com, Aug. 2003, pp. 1-3.
Hallam-Baker, Phillip, [CPE] Re: [Asrg] Re: [Politech] Congress finally poised to vote on anti-spam bill [sp], IETF ARGF Mailing List Online, Nov. 21, 2003, 2 pages.
Sachs, David, "Charles Hudson's Weblog" Internet Citation Online, Jun. 6, 2003, 2 pages.
PCT International Search Report and Written Opinion for International Application No. PCT/US2004/00408, mailed Sep. 30, 2004, 20 pages.
International Preliminary Examination Report (IPER) for International Application No. PCT/US2004/00408, mailed Feb. 13, 2006, 4 pages.
Cindy J. Lackey, State Official's Guide to Internet Privacy, The Council of State Governments, 2002, pp. 1-127.
"FTC Business Alert", Federal Trade Commission, Apr. 2002, pp. 1.
Lorrie Faith Cranor et al, Spam!, Communication of the ACM, 1998, pp. 1-10.
Examiner's Report, Canadian Application No. 2,514,122, dated Feb. 17, 2012, 3 pages.
Examiner's Report, Canadian Application No. 2,514,122, dated Mar. 25, 2013, 3 pages.

* cited by examiner

METHOD AND APPARATUS FOR A NON-REVEALING DO-NOT-CONTACT LIST SYSTEM

RELATED APPLICATIONS

This application is a divisional of application Ser. No. 12/259,941, filed Oct. 28, 2008, which is a divisional of application Ser. No. 10/671,119, filed Sep. 24, 2003, which claims the benefit of U.S. Provisional Application No. 60/442,273 filed Jan. 23, 2003, which are each hereby incorporated by reference.

BACKGROUND OF THE INVENTION

1. Field of the Invention

The invention relates to the field of communications. More specifically, the invention relates to security of communication information.

2. Prior Art

According to the Direct Marketing Association (DMA), in 2001 telemarketing accounted for $660 billion in sales. Consumer advocates estimate that more than 24 million calls are made daily by telemarketers (some households receive as many as 21 calls a week). In spite of their popularity with businesses, the telephone calls, which often interrupt people in their homes at inopportune times, are near the top of many consumers' lists of complaints.

In response to these complaints, twenty-seven state governments (Alabama, Alaska, Arkansas, California, Colorado, Connecticut, Florida, Georgia, Idaho, Illinois, Indiana, Kansas, Kentucky, Louisiana, Massachusetts, Maine, Minnesota, Missouri, New York, Oklahoma, Oregon, Pennsylvania, Tennessee, Texas, Vermont, Wisconsin, and Wyoming) have passed legislation creating so-called "do-not-call" lists. The lists, which have been extremely popular among consumers, allow citizens of a state to register their phone number as off-limits to telemarketing calls. Marketers who do not respect the lists face substantial liability. According to the DMA, being on the list can reduce the number of telemarketing calls a consumer receives by as much as 80%.

Because of their success, most of the remaining states are considering similar legislation. In addition, current Federal law requires telemarketers to maintain an internal do-not-call list for customers who ask to not receive phone calls, and the Federal Trade Commission (FTC) recently proposed creating a national do-not-call list.

In response to the need to limit liability faced by telemarketers who violate the various state- and Federally-mandated do-not-call lists, several technologies have been invented to manage the out-going calls and ensure compliance with the law. For example, U.S. Pat. No. 6,330,317, to Garfinkel, entitled "Call Blocking System," describes a system that automatically blocks outgoing calls to consumers who appear on either a company's internal or legally-mandated external do-not-call lists. The system interacts with a company's telephone system and automatically stops calls to phone numbers in a do-not-call database before they are dialed.

In addition, U.S. Pat. No. 6,130,937, to Fotta, entitled "System and Process for Automatic Storage, Enforcement and Override of Consumer Do-Not-Call Requests," describes a system and process for a company to manage do-not-call lists. The system described allows companies to efficiently store, update, and, when appropriate, override a do-not-call list. The list contains the telephone numbers of individuals who have expressed a desire not to be contacted. The system integrates both the company's internal do-not-call lists as well as any external lists, such as those mandated by various state laws.

The various solutions to creating and managing do-not-call lists currently go a long way toward solving the problem of unwanted telemarketing calls, but do not translate well to other communications media. The current embodiment of all do-not-call list technology inherently reveals the telephone numbers on the lists. At the present time, this is not a problem for do-not-call lists because 1) telephone numbers are already widely published in directories such as the white pages, and 2) making a telephone call is currently fairly expensive. A telemarketer must pay bandwidth fees to a telephone company, lease a telephone line, install equipment, and staff a call center in order to conduct business. In addition, inherent to the medium, only one telephone call can be made per phone line at any given time, necessarily limiting the number of phone calls that can be made by a telemarketer in any period. Joining a do-not-call list therefore does not risk subjecting a phone number to more phone calls from "rogue" telemarketers.

However, looking beyond phone calls and telemarketers, the current systems and technology for creating and managing do-not-call lists will not suffice for emerging, less-expensive, more-efficient communications media.

BRIEF SUMMARY OF THE INVENTION

A method and apparatus for a non-revealing do-not-contact list system is described. According to one aspect of the invention, a do-not-contact list of one-way hashed consumer contact information is provided to a set of one or more entities. The set of entities determine whether certain consumers wish to be contacted with the do-not-contact list without discovering actual consumer contact information.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details and implementations are set forth to provide a thorough understanding of the invention. However, it is understood that the invention may be practiced without the specific details of some of the implementations and embodiments. In other instances, well-known and understood circuit, structures, and techniques have not been described in detail so as not to obscure the invention.

Overview

A method and apparatus for creating, implementing, and administering non-revealing do-not-contact lists is described. These non-revealing do-not-contact lists allow the benefits of do-not-call lists to be brought to more-efficient communications media. In addition, the non-revealing do-not-contact list provides notice to entities to not send communications to entries on the non-revealing do-not-contact list without revealing the identities of the devices, their addresses, user accounts, contact numbers, etc. Communications media where such lists may be valuable include, but are not limited to, electronic mail (e-mail), instant messaging, web sites, domain systems, mobile phones, facsimile machines, etc.

Figure 1:
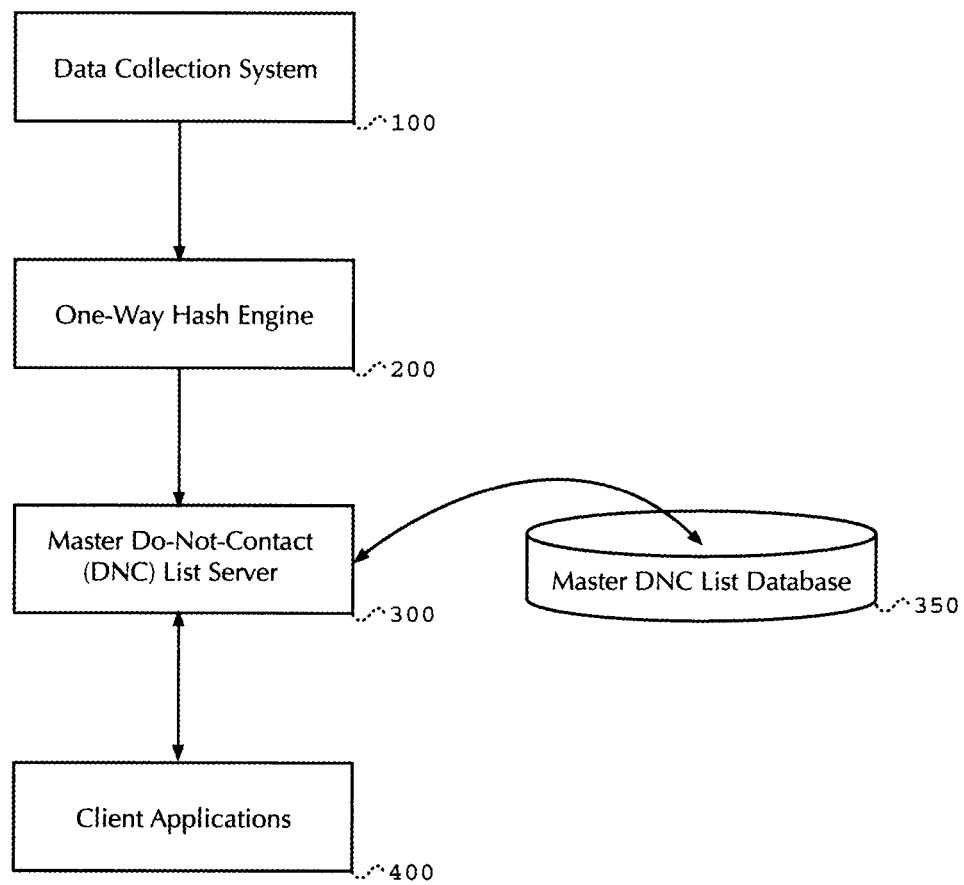
FIG. 1 is an exemplary block diagram of a non-revealing do-not-contact system according to one embodiment of the invention.

FIG. 1 is an exemplary block diagram of a non-revealing do-not-contact system according to one embodiment of the invention. The non-revealing do-not-contact system illustrated in FIG. 1 includes a Data Collection System 100, One-Way Hash Engine 200, Master Do-Not-Contact (DNC) List Server 300, a Master DNC Database 350, and a DNC List application 400. The public-facing Data Collection System (100) collects entries for the do-not-contact list and any associated demographic or identifying information. While in one embodiment of the invention, the Data Collection System 100 is a web site that prompts visitors for data through a single page or a series of pages, in alternative embodiments of the invention the Data Collection System 100 is a system that takes entries via telephone, receives entries sent in by postal or electronic mail, retrieves entries from a local or remote database, uploads them from a disk or other media, scans them from paper forms, a combination of any of the above, etc. Examples of do-not-contact list entries are hashed copies of e-mail addresses, user identifiers, domain names, instant message identifiers, telephone numbers, or any other information that identifies an individual communication device or account so it can be contacted. The additional or demographic information collected could be the legal jurisdiction that applies to the holder of the do-not-contact list entry, whether the holder of the do-not-contact list entry is a minor or adult, specific types of messages that are not allowed to be sent to the do-not-contact list entry, the type of one-way hash used, or other restrictions that apply to the particular do-not-contact list entry. Examples of uses for the above are provided herein.

Figure 2:
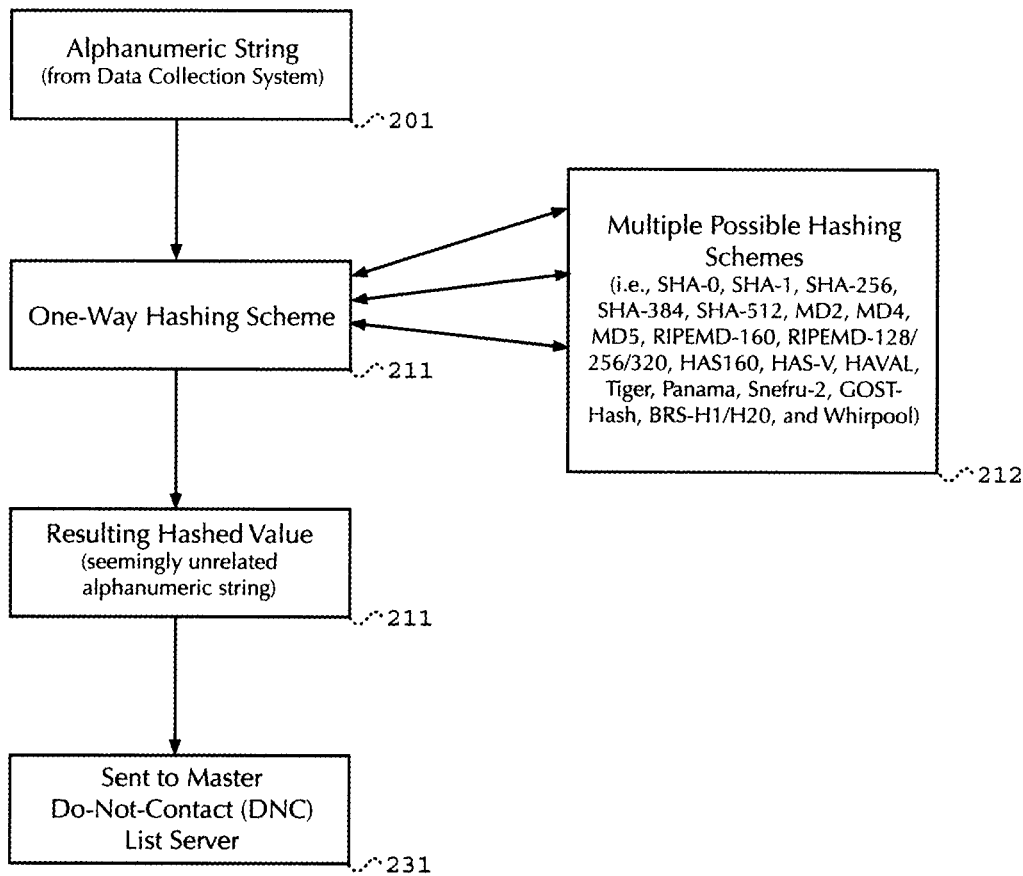
FIG. 2 is an exemplary block diagram of a One-Way Hashing Engine according to one embodiment of the invention.

FIG. 2 is an exemplary block diagram of a One-Way Hashing Engine according to one embodiment of the invention. The One-Way Hashing Engine (200) illustrated in FIG. 2 is a mathematical scheme that takes a string of characters (e.g., alphanumeric characters, alphabetic characters, numerals, symbols, etc.) processes them, and returns a new, unique, fixed-length string (the "hashed value"). The hashed value bears seemingly no resemblance to the original string. The nature of a one-way hash is that, while easy to process in one direction—going from the original string to the hashed value—it is nearly impossible to go from the hashed value back to the original string. The One-Way Hashing Engine 200 encrypts an entry before it is stored in the Master Do-Not-Contact List. In particular, the One-Way Hashing Engine 200 receives an entry in the form of a string of characters (201), encrypts the string using a hashing scheme (211), outputs the resulting hashed value (221), and then passes the hashed value that results to the Master Do-Not-Contact List Server (231). There are several industry standard one-way hashing schemes that include, but are not limited to, SHA-0, SHA-1, SHA-256, SHA-384, SHA-512, MD2, MD4, MD5, RIP-EMD-160, RIPEMD-128/256/320, HAS160, HAS-V, HAVAL, Tiger, Panama, Snefru-2, GOST-Hash, BRS-H1/H20, and Whirpool. It is to be appreciated that other encryption schemes can be used to encrypt the string of characters (201) instead of the one-way hashing scheme or the listed hashing schemes herein. The hashed value (211) thus can be an encrypted value encrypted by another encryption scheme other than the one-way hashing scheme or the listed hashing schemes herein. In one embodiment of the invention, the non-revealing do-not-contact system uses different one-way hash schemes for different users (212) for technical, marketing, or political reasons. In one embodiment of the invention, the type of hash scheme used is specified by the Data Collection System, in whatever its form, and a key representing it is included in an entry record as additional information. A default hash scheme may be used if another hashing scheme is not specified during data collection.

Returning to FIG. 1, after the entry is processed by the One-Way Hash Engine (200), the resulting hashed value is passed to the Master Do-Not-Contact List Server (300). The Master Do-Not-Contact List Server stores the hashed value in the Master Do-Not-Contact List Database (350). While in one embodiments of the invention the original, unencrypted contact information entry is not stored in any kind of long-term storage, alternative embodiments of the invention securely store this information for a period of time. The new entry is associated in the database 350 with any additional or demographic information that was entered during data collection to form a record. The database management and query functions between the Master Do-Not-Contact List Server (300) and the database (350) can be implemented using any standard database techniques (e.g. the SQL structured database language). Typical functions as part of any embodiment include insert, retrieve (select), delete, and sort. In one embodiment of the invention, the database is sorted based on the additional information that is associated with each record. Within each category, the records are sorted by character values of the hashes (e.g., alphabetical order). In an alternative embodiment, if the particular do-not-contact list contains substantially similar additional information for each record, the database is sorted based on only the values of the hashes. Other standard data management schemes can be used to keep the data efficiently organized for quick insertion of new data, sorting, and retrieval. While in one embodiment of the invention, the Data Collection System (100), the One-Way Hashing Engine (200), the Master Do-Not-Contact List Server (300), and the database (350) are hosted on a single device, in an alternative embodiment of the invention, they are implemented in a distributed scheme (e.g., implemented on multiple devices in a local area network).

The Client Do-Not-Contact List Applications (400) in FIG. 1 are deployed on multiple remote computers of individuals or businesses ("clients") that send unsolicited communications or otherwise store or use contact information. In one embodiment of the invention, one or more of the Client Do-Not-Contact List Applications (400) interact with the Master Do-Not-Contact List Server (300) via a network. The network can be established to transfer data between the two over the Internet or directly between the client machine and the client server. Periodically certain of the Client Do-Not-Contact List Application (400) requests new entries from the Master Do-Not-Contact List Server (300). The new records retrieved from the Master Do-Not-Contact List Server (300) are combined with any old entries and sorted to create a Client Do-Not-Contact List. Depending on the settings of the particular version of the Client Do-Not-Contact List Application(s) (400), the information sent from the Master Do-Not-Contact List Server (300) to the Client Do-Not-Contact List Application (400) on a particular request could be limited to new records added to the Master Do-Not-Contact List since the last Client Application's request, records sorted by certain additional or demographic information, records sorted by the type of hash used, records sorted based on some other characteristics to limit the data transferred, etc.

In another embodiment of the invention, the information can be stored on a compact disc (CD), digital video disc (DVD), or other storage media and delivered via postal mail or some other physical means. The Client Do-Not-Contact List Application (400) can incorporate new information into the Client Do-Not-Contact List whether it is received via the network or some other means.

Figure 3:
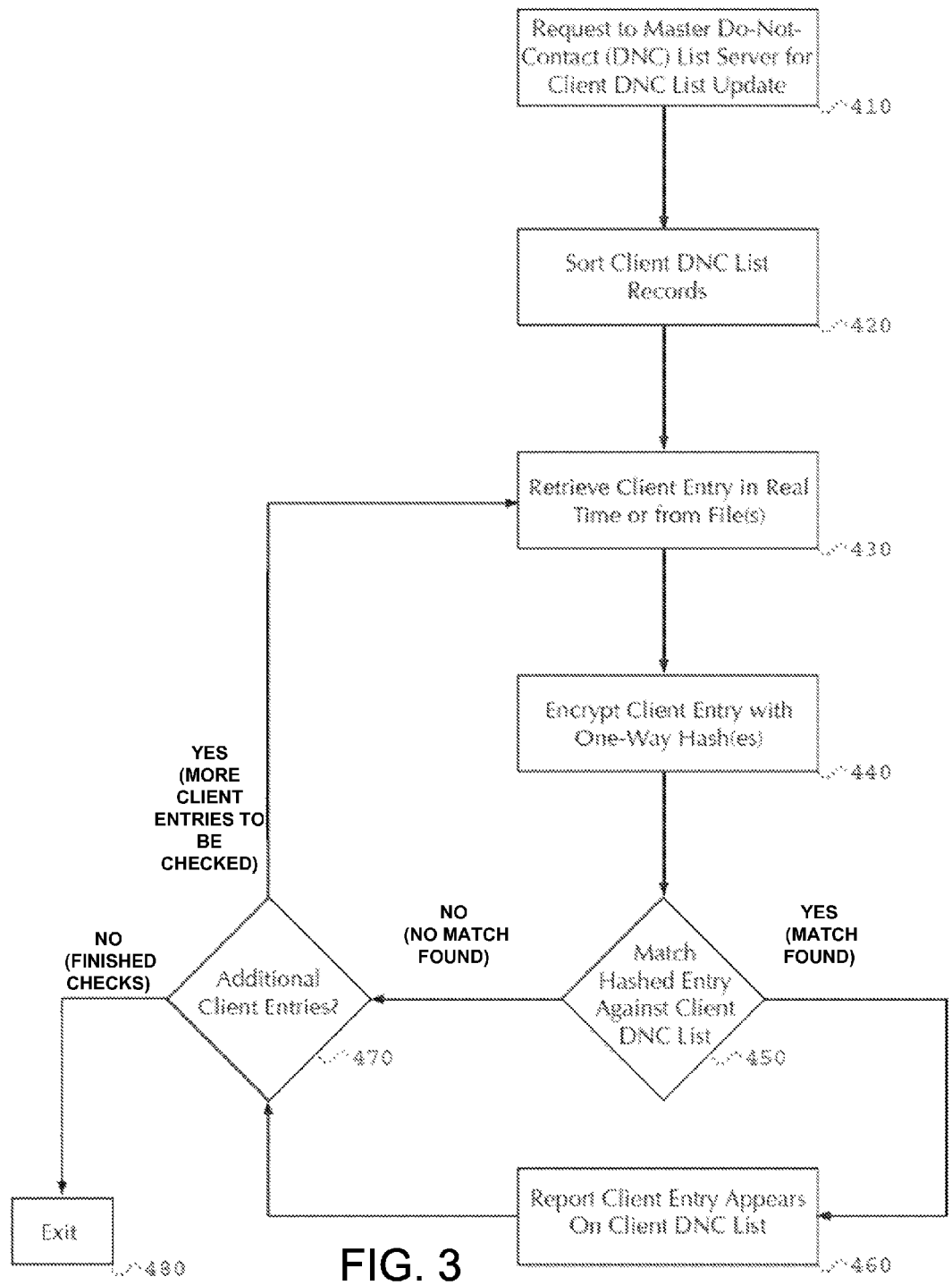
FIG. 3 is an exemplary flow chart of a client returning a do-not-contact list according to one embodiment of the invention.

FIG. 3 is an exemplary flow chart of a client returning a do-not-contact list according to one embodiment of the invention. As illustrated in FIG. 3, an update is requested from the Master DNC List Server (410). The Client DNC list is sorted (420). For example, the Client DNC list is sorted into categories by the Client Do-Not-Contact List Application according to any additional or demographic information and then, within the categories, alphabetically by the alphanumeric hashed value contained in each record.

Once the latest version of the Client Do-Not-Contact List is downloaded and sorted by the Client Do-Not-Contact List Application, the Client Do-Not-Contact List Application can check any contact information stored on the client's machine against the Client Do-Not-Contact List. The entries to be checked can be stored on the client's machine in files or other forms of existing lists, or they can be entered and checked in real time. As shown in FIG. 3, entries stored on the client's machine are retrieved one at a time (430). This can be done in real time, checking entries as they are entered on the client's machine or as messages are sent out from the client, or it can be done in batch mode, checking a file, or multiple files, containing lists of addresses at one time. These two approaches are described in FIG. 4 and FIG. 6. Regardless of how they are retrieved by the Client Application, each entry is encrypted, using the same one-way hash scheme as was used to encrypt the Master Do-Not-Contact List entry (440). A reference key is kept by the Client Do-Not-Contact List Application to identify the unencrypted entry that is being checked. The encrypted client entry is then checked against the hashes in the Client Do-Not-Contact List (450).

If multiple one-way hashes were used in one embodiment of the invention, the Client Do-Not-Contact List records are sorted by the type of hash used and then each client entry is encrypted once for each hash and checked against the portion of the Client Do-Not-Contact List that was encrypted using the same hashing scheme. If there is not a match, the control flows to block 470. In an alternative embodiment of the invention, the Client DNC list is not sorted. If there is a match between the encrypted client entry and a Client Do-Not-Contact List hash then the Client Do-Not-Contact List Application looks up the unencrypted client entry using the reference key and reports that the entry appears on the Client Do-Not-Contact List (460). The Client Do-Not-Contact List Application can issue this report on the screen of the client's computer, in a file that is generated as soon as the check is done, by returning a value that the check failed to the application that called the Client Application, or by automatically purging the entry from the file or files on the client's machine. If there are additional client entries to be checked, then control flows from block 470 to 430 and the process is repeated. If there are no additional client entries to be checked, the Client Application exits (480).

While the flow diagram shows a particular order of operations performed by certain embodiments of the invention, it should be understood that such order is exemplary (e.g., alternative embodiments may perform the operations in a different order, combine certain operations, overlap certain operations, etc.). Some alternative embodiments of the Client Application are described in greater detail herein.

Figure 4:
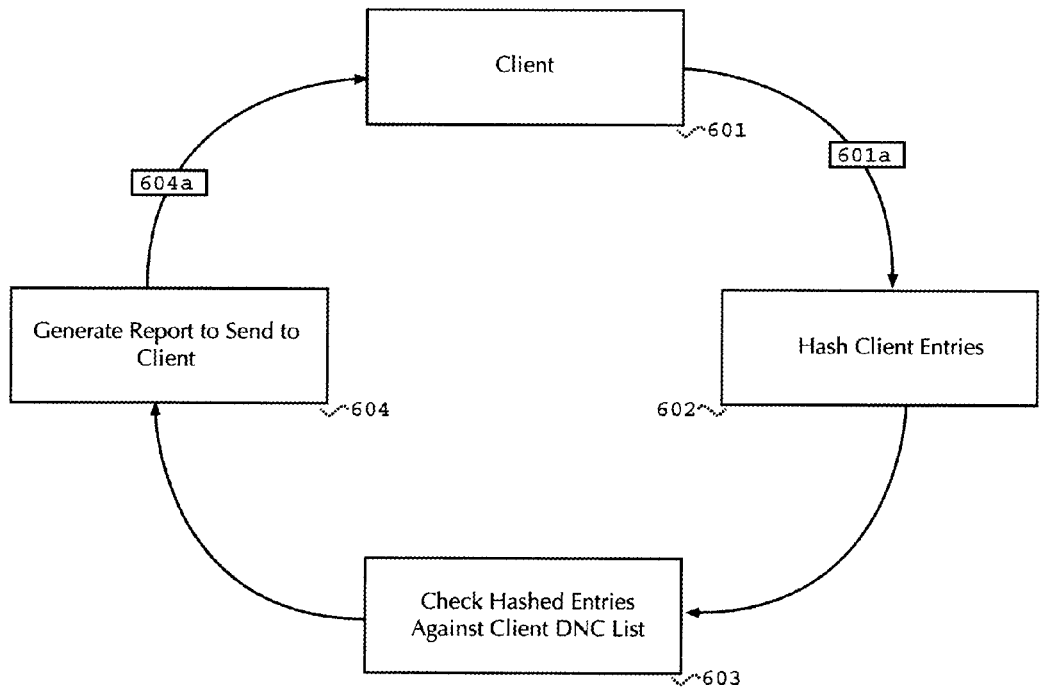
FIG. 4 is an exemplary flow chart of checking an entry in a do-not-contact list according to one embodiment of the invention.

FIG. 4 is an exemplary block diagram of an alternative embodiment of the Client Do-Not-Contact Application according to one embodiment of the invention. In FIG. 4, the Client Do-Not-Contact Application is hosted remotely and accessed by the client over a network. The client's list of entries to be checked against the do-not-contact list are transferred to the remote Client Do-Not-Contact Application (601*a*). The transfer of client entries may be accomplished via a network connection, e-mail, disk, scanned forms, etc. Once entries to be checked are transferred and, one-by-one, hashed (602), the Client Do-Not-Contact Application checks each hashed entry against the Client Do-Not-Contact List (603). Once all the client entries are checked, the remote Client Do-Not-Contact Application generates a report (604) and returns its information indicating which client entries appear on the Client Do-Not-Contact Application (604*a*). In one embodiment, the remote Client Do-Not-Contact Application returns all the client entries which do not appear on the Client Do-Not-Contact List in the form of a file. In an alternative embodiment, the remote Client Do-Not-Contact Application returns the client entries that appear on the Client Do-Not-Contact List. It should be understood that several alternative embodiments of the remote Client Do-Not-Contact Application are possible. These embodiments could receive or process client entries in different ways (e.g., receiving client entries in an encrypted form, returning specific subsets of the resulting data, returning the data in different form of files or streams of output, etc.).

Client do-not-Contact List Application Implementations

Figure 5:
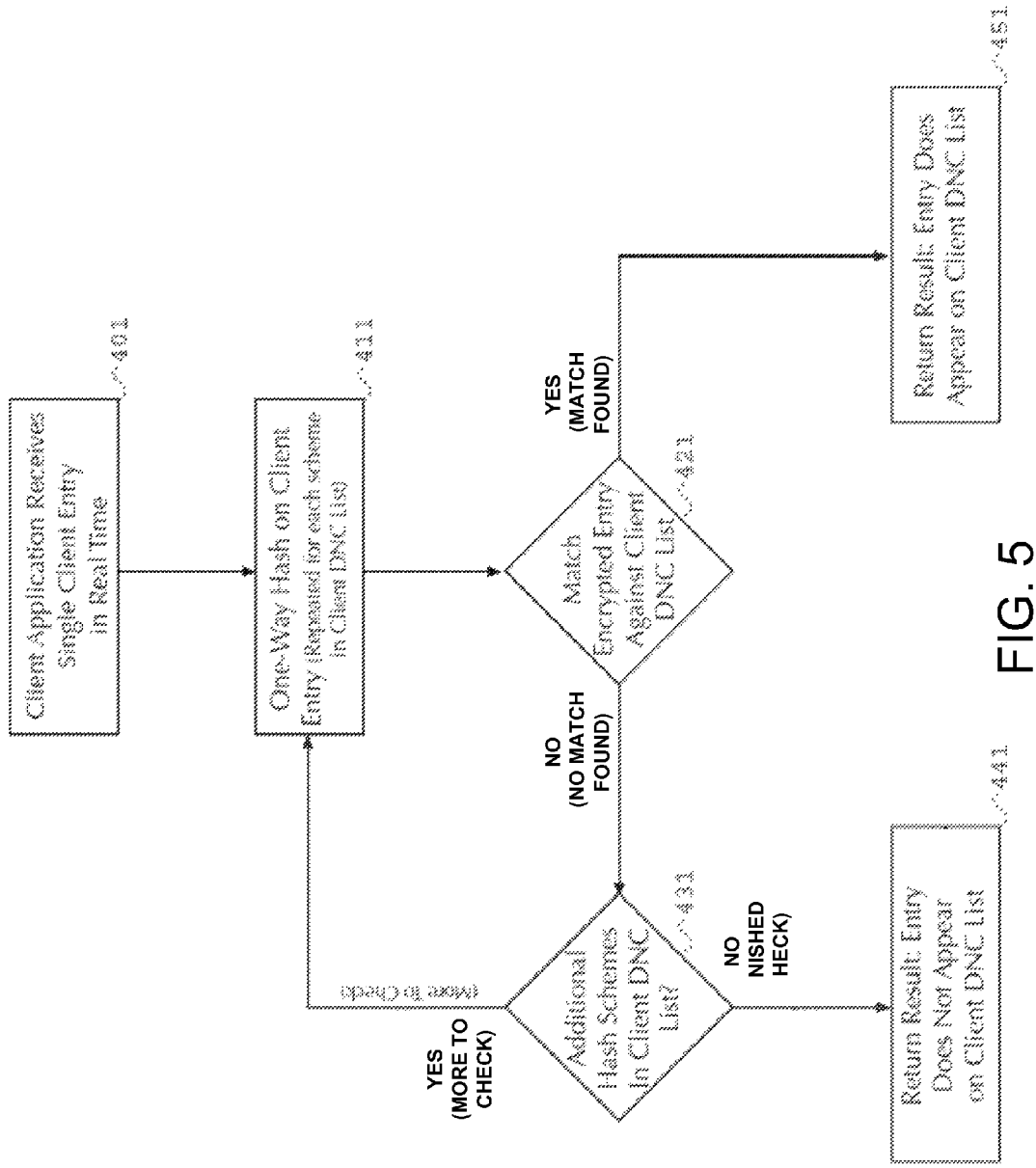
FIG. 5 is an exemplary block diagram of a Client Application hosted on a remotely according to one embodiment of the invention.

FIG. 5 is an exemplary flow chart of checking an entry in a do-not-contact list according to one embodiment of the invention. This implementation could be used, for example, by a web site that registers new user accounts or to monitor messages and verify none appear on the Client Do-Not-Contact List as they are sent by the client's machine. When new registrants enter their personal information or messages are sent from the client's machine, any communications device entries, such as e-mail addresses, instant messenger addresses, facsimile numbers, or mobile phone numbers, can be fed to the Client Do-Not-Contact List Application (401). Each of the registrants' entries is then run through a one-way hash as part of the Client Do-Not-Contact List Application for each hash scheme that was used to encrypt the Client Do-Not-Contact List (411).

The resulting hashed entries are compared against the Client Do-Not-Contact List (421). If a match is found, the Client Do-Not-Contact List Application returns a value indicating the newly entered information is restricted (451). In that case, in the example of a web site that registers users, the web site can then alert the attempted registrant that he or she is not allowed to register or take other appropriate action. This could be appropriate, for example, for a child attempting to register for a web site that sold adult materials. In the case of the message-monitoring client, the offending message may be quarantined and the client alerted. If there is no match, if the Client Do-Not-Contact List were created using multiple hash schemes then the client entry is hashed one time for each hash scheme (431). Each resulting hash is then compared only against the portion of the Client Do-Not-Contact List encrypted with the same scheme. The Client Do-Not-Contact List Application can return a result indicating the entry does not appear on the Client Do-Not-Contact List (441). In this case, the registration or message delivery would be allowed to continue. The version of the Client Do-Not-Contact List Application described in FIG. 4 can be written in a wide variety of computer languages and deployed on a number of different platforms. The types of platforms where it may be of use include, but are not limited to, web sites and web servers, mail order data entry terminals, telephone data entry machines, other devices that accept communications device entries, etc.

Figure 6:
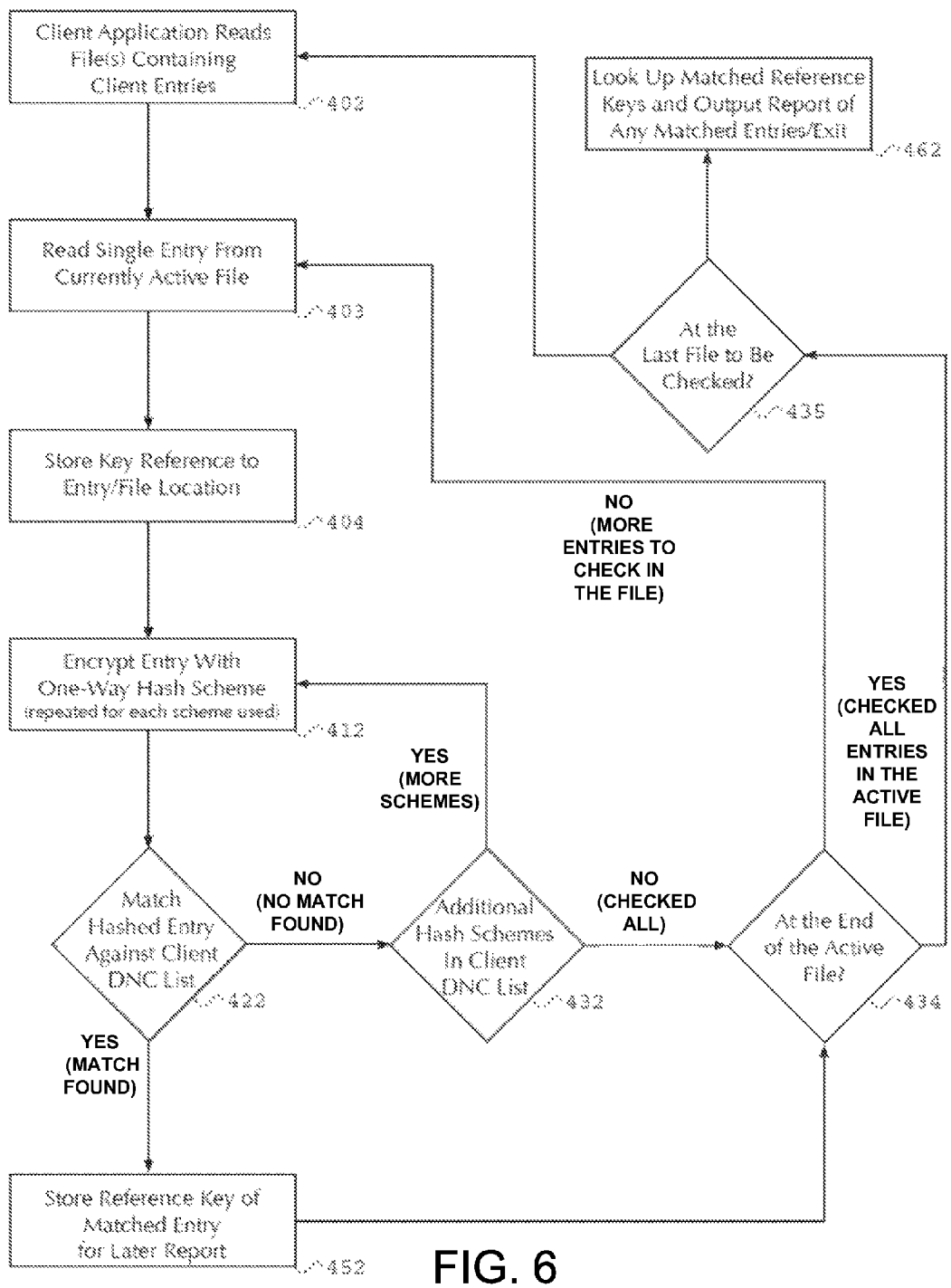
FIG. 6 is a flow chart diagram for checking a file or multiple files of entries and performing the appropriate operation according to one embodiment of the invention.

FIG. 6 is an exemplary flow chart for checking a file or multiple files of entries and performing the appropriate operation according to one embodiment of the invention. In FIG. 6, list entries are checked against the Client Do-Not-Contact List in batch mode. The Client Do-Not-Contact List Application reads one or more files (402). The files contain multiple list entries in a format that can include, but is not limited to, comma-delimitated, tab-delimitated, or carriage return-delimitated as well as databases such as MySQL, dBase, Sybase, Oracle, mSQL, Microsoft SQL Server, etc. The Client Do-Not-Contact List Application reads each file and extracts the list entries (403). Before processing, a key is stored as a reference to the entry's location in the file being processed in case the original, unencrypted list entry needs to be retrieved (404). Each list entry is then run through the Client Do-Not-Contact List Application's one-way hash engine (412). The hashed entry is then matched against the Client Do-Not-Contact List (422). If there is a match then a reference key to the matched entry is stored to be reported later (452) and the control flows to block 434. If there is no match to the Client Do-Not-Contact List then the control flows to block 432. If block 432 finds there are additional hash schemes used in the Client Do-Not-Contact list then control is passed back to block 412 and the original entry is encrypted with the next hash scheme. If there are no more hash schemes used in the Client Do-Not-Contact List then flow is passed to block 434. If at this point the Client Application has come to the end of the current file being checked, then control flows from block 434 to block 435. If there are additional entries left in the file, control flows back to block 403 and the process is repeated for the next entry. If block 435 finds there are additional files to be checked then control flows back to 402 and the process is repeated for the next batch file. If there are no additional files to be checked, the Client Application retrieves any entries that appeared on the Client Do-Not-Contact List and reports them (462). The report can be in the form of a file, displayed on the screen, automatically purged from the batch files, etc.

Figure 7:
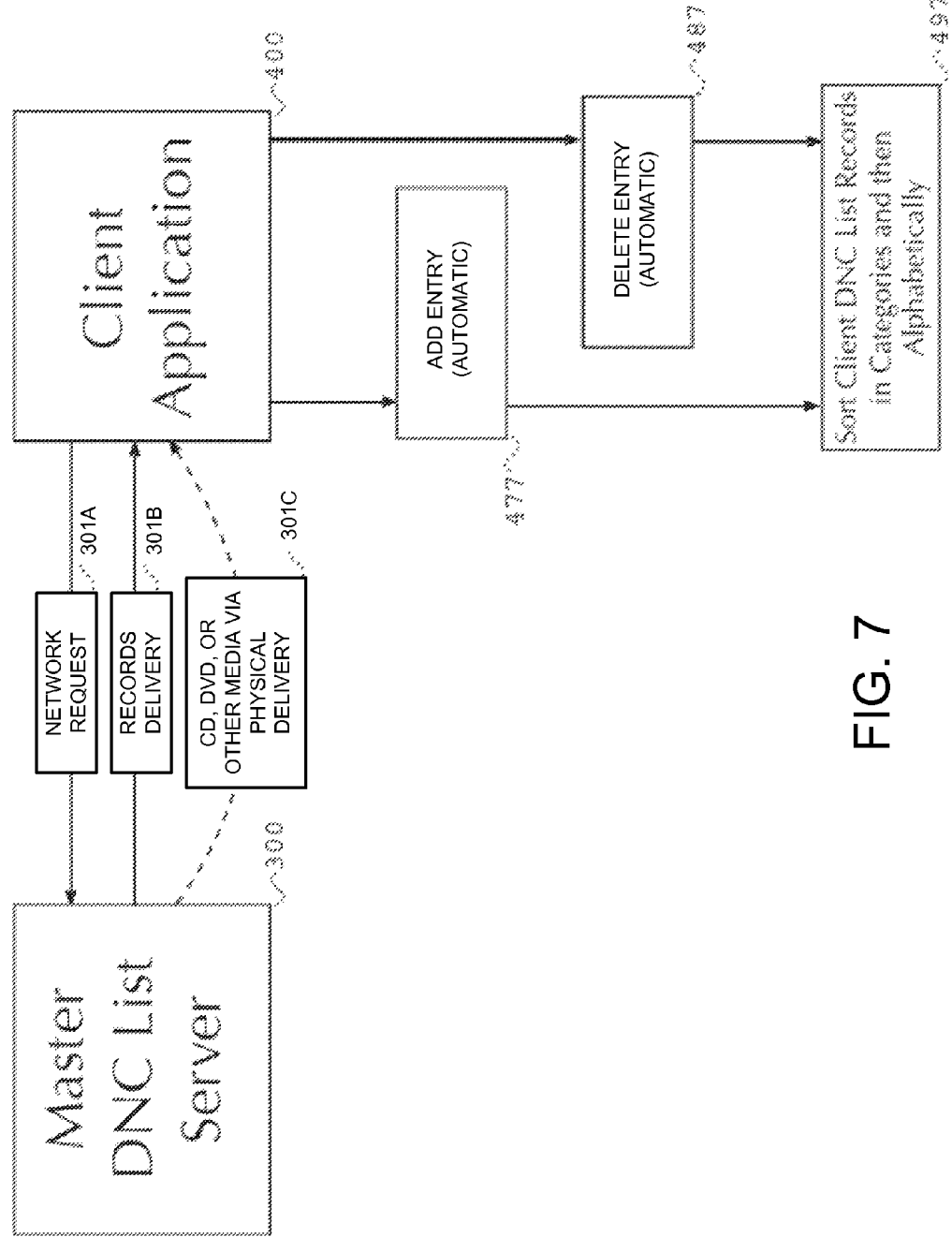
FIG. 7 is a block diagram of interaction between a Master Do-Not-Contact Server and a Client Application illustrating add and delete functions according to one embodiment of the invention.

FIG. 7 is a block diagram of interaction between a Master Do-Not-Contact List and a Client Do-Not-Contact List Application illustrating add and delete functions according to one embodiment of the invention. A Client Do-Not-Contact List Application can receive periodic updates to its Client Do-Not-Contact List by requesting them from the Master Do-Not-Contact List Server via a network (301*a*). The updates (301*b*) can contain the entire Master Do-Not-Contact List and any associated additional or demographic data, or any portion thereof. For example, the Client Do-Not-Contact List Application could request just those records on the Master Do-Not-Contact List that have been added since the last update, or just records with certain additional or demographic information. If a network connection is not available, or the amount of data to be downloaded is prohibitively large, data can be sent to the client on a CD, DVD, or other media (301*c*). In this case, the Client Do-Not-Contact List Application can upload the data from the media and automatically incorporate it into the Client Do-Not-Contact List (477).

Figure 11:
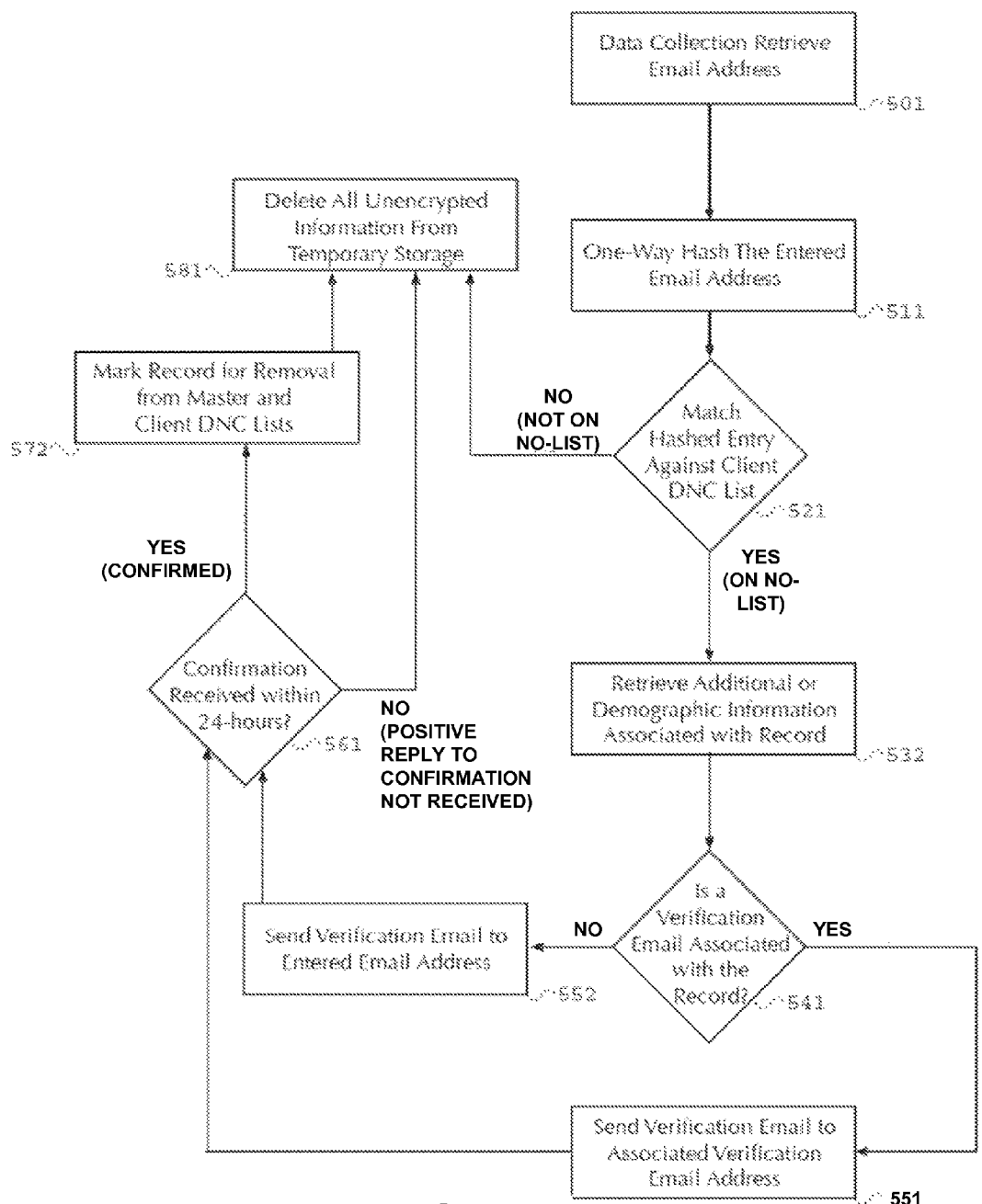
FIG. 11 is a flow chart for removing entries from a Master Do-Not-Contact List according to one embodiment of the invention.

New records retrieved for the Client Do-Not-Contact List, whether delivered via the network or manually through some other media, are added to any previously existing Client Do-Not-Contact List records. The records are sorted within categories by the additional or demographic information, and then sorted alphabetically by the alphanumeric value of each record's hash (497). In one embodiment of the invention, the sorting is accomplished using an industry standard sorting scheme (e.g., bubble sort, selection sort, merge sort, quick sort, etc). Alternative data organization or sorting schemes could be used to speed up matching, sorting, or additions within the Client Do-Not-Contact List. In the same way that records can be downloaded and added, entries that have been marked to be removed are downloaded at the time the Client Do-Not-Contact List Application requests an update and purged from the Client Do-Not-Contact List (487). The process of removal, according to one embodiment of the invention, is illustrated in FIG. 11.

Additional records can be added to the Client Do-Not-Contact List locally. This may be appropriate if clients keep their own internal do-not-contact list.

Figure 8:
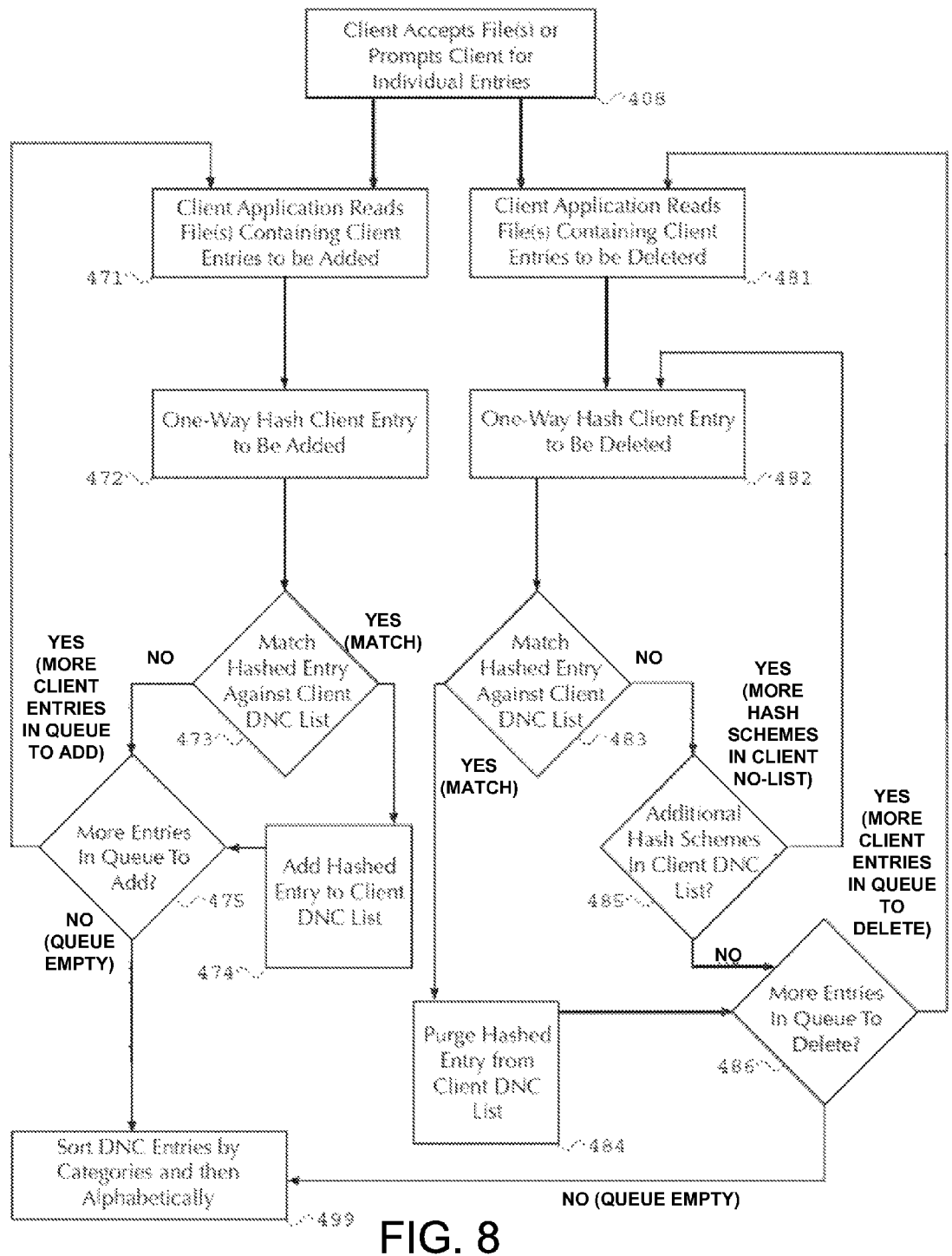
FIG. 8 is a flow chart of a Client Do-Not-Contact List Application adding or deleting entries to a Client Do-Not-Contact List according to one embodiment of the invention.

FIG. 8 is a flow chart of a Client Do-Not-Contact List Application adding or deleting entries to a Client Do-Not-Contact List according to one embodiment of the invention. As illustrated in FIG. 8, a client adds new records into the Client Do-Not-Contact List using the Client Do-Not-Contact List Application. The Client DNC Application accepts file(s), prompts users for individual entries, etc. This can be done individually or in batch mode by loading a file with multiple lists (471). The Client Do-Not-Contact List Application runs each entry to be added through a default one-way hash (472) then passes control to block 473. If block 473 finds a match between the hashed entry and the Client Do-Not-Contact List then the hashed entry is added to the Client Do-Not-Contact List (474). After the hashed entry is added, or if no match is found, control flows to block 475. If there are additional client entries to be added, control flows back to 471 and the process is repeated for the next entry. Otherwise, the entries in the Client Do-Not-Contact List are sorted by category and then alphabetically within each category (499) and the process is completed.

Also illustrated in FIG. 8, the same process can be used to locally purge records from the Client Do-Not-Contact List (481). For example, if an individual has opted-in to receiving messages from a marketer, the marketer can remove the records matching the individual's data from the Client Do-Not-Contact List. Again, just as with additions, entries to be deleted may be entered individually or may be loaded from a file with multiple entries (481). Each entry is run through each one-way hash used in the Client Do-Not-Contact List (482) then passed to block 483. The hashed value is compared against the appropriate records from the Client Do-Not-Contact List (483). If there is a match then the record is deleted from the file (484) and flow passes to block 486. If there is no match then control flows to block 485. In block 485, if there are additional hashing schemes used in the Client Do-Not-Contact List then control flows back to block 482 and the process is repeated for the next hash scheme. If there are no additional hashing schemes in the Client Do-Not-Contact List then control flows to block 486. If there are more entries to be deleted then control returns to block 481, otherwise the Client Do-Not-Contact List is sorted by category and then alphabetically within each category (499) and the process is completed.

Do-not-E-Mail List Implementations

In one implementation of the invention, a do-not-e-mail (DNE) list (i.e., a do-not-contact list of e-mail addresses) is created. E-mail is provided as an example, however the same techniques described herein could be used to create a do-not-contact list for other forms of communications medium (e.g., online messenger, telephone, cell phone, etc.). The e-mail implementation allows individuals to place their addresses on a DNE list, and the list to be published publicly without risk of the individuals' addresses being revealed.

Since e-mail addresses are inherently different from telephone numbers, traditional do-not-call lists which are successful because a telemarketer is limited by the expense and time required to make a phone call do not protect other contact information such as e-mail addresses. A bulk e-mailer working on a single personal computer can send literally millions of electronic messages in an hour at a significantly lesser expense than phone calls. This difference explains why the white pages can publish nearly every phone number in the country without the numbers being overwhelmed by telephone calls, but the equivalent of the white pages will never exist for e-mail addresses. If it did, those e-mail addresses could be so overwhelmed by bulk e-mail as to become unusable.

DNE lists are a way to reduce or eliminate unwanted unsolicited e-mail in that they could serve to alert online marketers which e-mail addresses are off-limits, the same way do-not-call lists alert telemarketers which phone numbers are off-limits. However, a DNE list must be secure and require a fundamentally different implementation than do-not-call lists, because publishing a DNE list in the clear, the way do-not-call lists currently are, would provide the addresses to rogue marketers, thus exposing all of the contact information for abuse.

Figure 9:
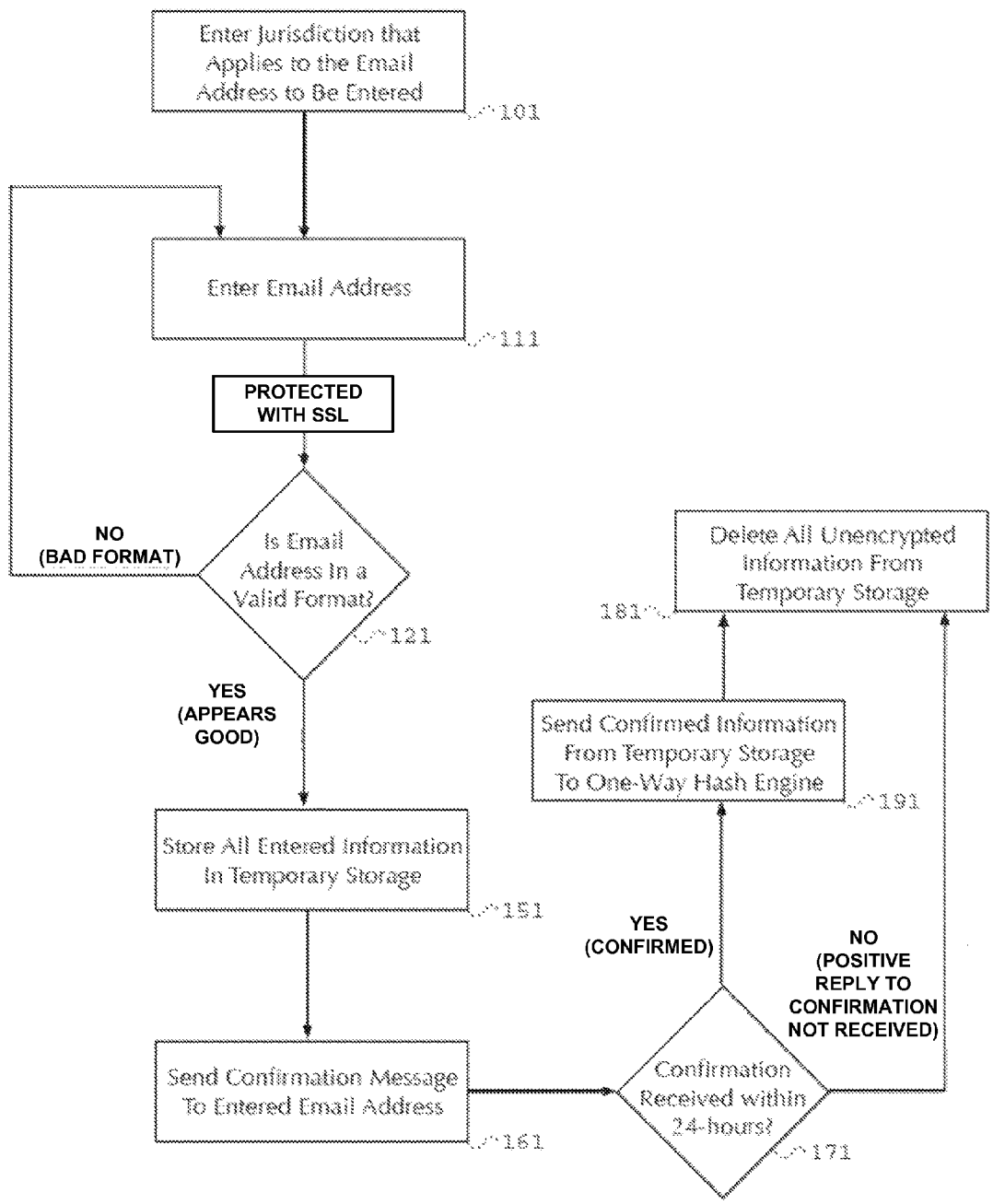
FIG. 9 is a flow chart for generating a do-not-contact list of e-mail addresses according to one embodiment of the invention.

FIG. 9 is a flow chart for generating a do-not-contact list of e-mail addresses according to one embodiment of the invention. A consumer is prompted for the jurisdictions that apply to them (101). The jurisdiction can be as general as the country or countries where the e-mail address is checked, or, if different laws regarding the sending of unsolicited e-mail apply to smaller entities within the country (i.e., states, provinces, counties, cities, or towns), then more-specific jurisdictional information can be collected and stored. After a jurisdiction is specified, the consumer is prompted for their e-mail address (111). If the e-mail address is sent over an insecure network or other medium which risks revealing the address, the transmission may be encrypted with a standard scheme (e.g., SSL, etc). Usual checks are preformed to ensure that the e-mail address is properly formatted (e.g., ensuring it contains an "@" sign and does not contain any prohibited characters) (121). If the entered address is not properly formatted, the consumer is prompted to correct their address. The system then places the information the consumer has entered in temporary storage keyed with a unique identifier (151). Alternative implementations within this embodiment allow for entries to be provided by a third party (e.g., as an Internet Service Provider, consumer group, etc), via telephone, via scanned forms, email, etc.

An e-mail is sent to the address that was entered in order to verify the address belongs to the consumer who entered it and he or she in fact wants to be included on the DNE list (161). If the consumer does not respond to the verification e-mail within a specified period of time (in the example, 24 hours), the information that was entered is deleted from temporary storage (181). If the e-mail address is verified within the specified period of time, the information is passed to the one-way hash engine (191) and then deleted from temporary storage (181). The entry continues as described in FIG. 1 and ends up stored on the Master Do-Not-Contact List and eventually on individual Client Do-Not-Contact Lists. With a non-revealing do-not-contact list system, consumers can put bulk e-mailers on notice that they do not want to receive unsolicited e-mail. Since actual contact information (e.g., e-mail addresses) is not stored in long-term storage and is not revealed and in some embodiments not stored in long term storage, the list remains secure and cannot be compromised by rogue marketers even if it is stolen or intercepted when sent to the Client Do-Not-Contact List Application.

An alternative embodiment of the DNE list allows parents to indicate the e-mail addresses that belong to their children and should not be targeted by marketers.

Figure 10:
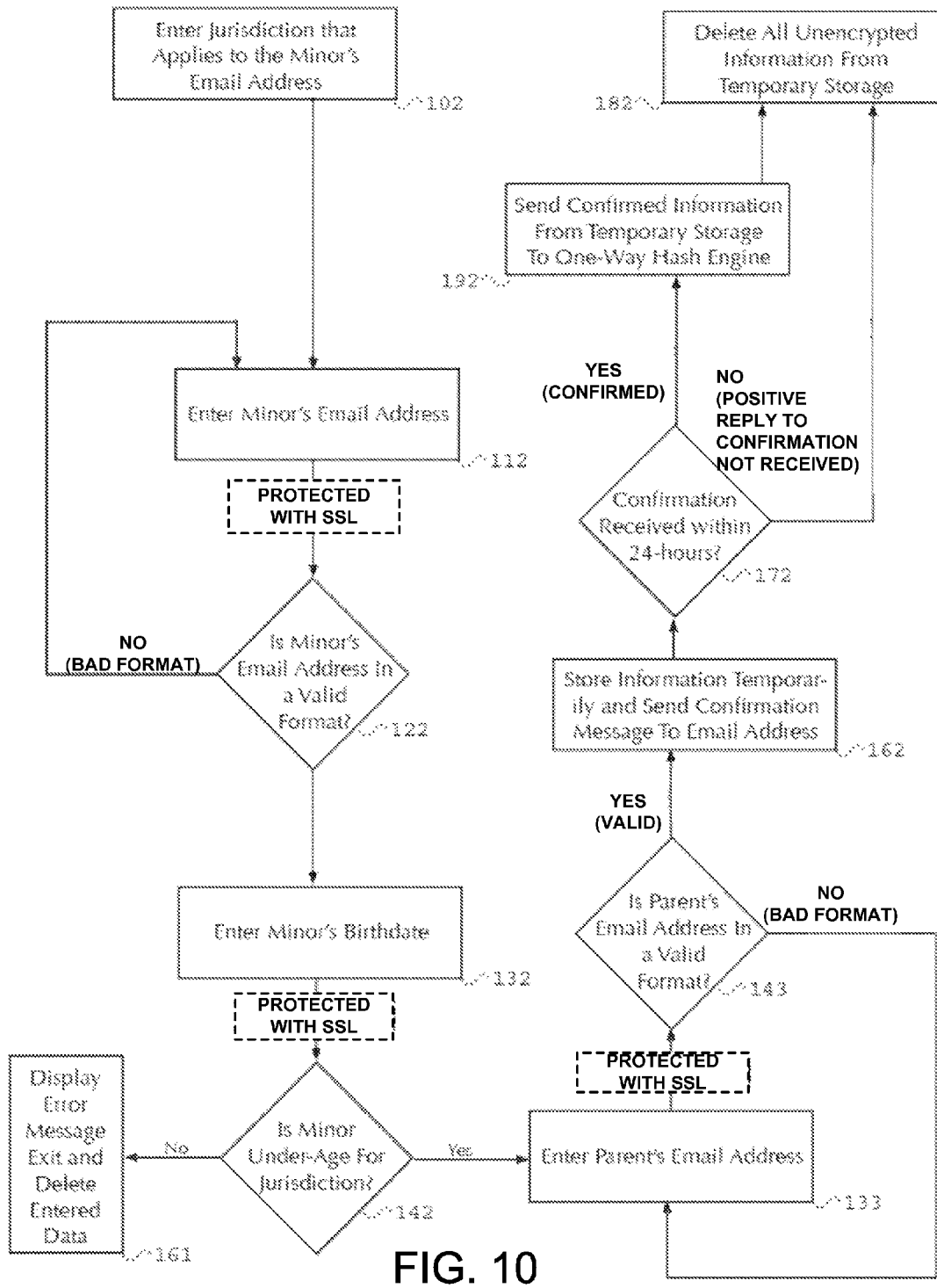
FIG. 10 is a flow chart for generating a do-not-contact list of e-mail addresses of minors according to one embodiment of the invention.

FIG. 10 is a flow chart for generating a do-not-contact list of e-mail addresses of minors according to one embodiment of the invention. First, parents are prompted for the jurisdiction that applies to their children (102). They are then asked to enter the e-mail address of their children (112). If the e-mail address is sent over an insecure network or other medium which risks revealing the address, the transmission may be encrypted with a standard scheme (e.g., SSL, etc). Standard checks are performed to ensure the entered e-mail address is valid (122). If it is not, control flows back to block 112 and the parent is prompted to re-enter their child's address. Otherwise, control flows to block 132 where the parent is prompted for their child's birth date. If the birth date is sent over an insecure network or other medium which risks revealing the address, the transmission may be encrypted with a standard scheme (e.g., SSL, etc). In block 142, the system checks whether the child is considered a minor in the jurisdiction that was entered in block 102. If the child is not considered a minor, the system displays an error message and exits (161). Otherwise, control flows to block 133 where the parent is prompted for their own email address. If the e-mail address is sent over an insecure network or other medium which risks revealing the address, the transmission may be encrypted with a standard scheme (e.g., SSL, etc).

In this embodiment of the invention, a parent's address is stored and associated with the Master Do-Not-Contact List record in order to provide verification if, in the future, there is a request to remove the child's address from the Master Do-Not-Contact list. The system can also automatically check the list of minors and remove the records of any of those who have reached the age of majority in the specified jurisdiction. After a parent's e-mail address is provided, standard checks are performed to ensure the email address is valid (143). If an address is found to have an invalid format, then control flows back to block 133 where the parent is asked to re-enter the address. Otherwise, the information entered is stored and a confirmation message is sent to the parent's address (172). If confirmation is received within a specified period of time then the information is retrieved from storage and sent to the One-Way Hash Engine (192) and down the chain of control specified in FIG. 1. After that, or if confirmation is not received within the specified time period, the unencrypted information is purged from temporary storage on the system (182). In an alternative embodiment of the invention, a parent specifies a period of time for their child's address to be on a DNC list instead of defaulting with a certain age.

FIG. 11 is a flow chart for removing entries from a Master Do-Not-Contact List according to one embodiment of the invention. If individuals want to be removed from the Master Do-Not-Contact list they provide their e-mail address (501). The entered e-mail address are passed through the one-way hash engine (511). The resulting hashed entries are matched by the Master Do-Not-Contact List Server against the records stored in the database (521). If there is no match then the request to remove the address is discarded (581). On the other hand, if there is a match, the Master Do-Not-Contact List Server retrieves any additional or demographic data (532) and control flows to block 541. If the additional information indicates a verification e-mail address is associated with the matched record (for example, if the address belongs to a minor) then a verification e-mail is sent to the verification address (551). If there is no verification e-mail address associated with the record then the verification e-mail is sent to the pre-hashed address (552). In either case, if, within a prescribed period of time (561), there is no reply to the verification e-mail confirming the desire to remove the address the request to delete, the entry is discarded (581). If there is a reply confirming the request then the entry is marked on Master Do-Not-Contact List to be removed from that list and Client Do-Not-Contact Lists (572). The next time a Client Do-Not-Contact List Application requests an update, the Client Do-Not-Contact List Application downloads the marked entry and removes the listing from the Client Do-Not-Contact List. While this description describes the removal of an e-mail address, the operations described with reference to FIG. 11 can be implemented for other types of contact information.

Continuing with the DNE list example, the Client Do-Not-Contact List Application can be kept on the computers or other devices of e-mail marketers. The marketers can use the Client Do-Not-Contact List Application to periodically check their bulk e-mail lists to ensure addresses they send e-mail to have not requested to be kept free of so called "spam." Additionally, web sites selling adult products can use the Client Do-Not-Contact List Application to check to see if an e-mail address belongs to a minor before granting access to their sites. Or, in an alternative embodiment, the Client Application may integrate with a client's mail server and check messages as they are sent by the client. If the address of one of the outgoing messages appears on the Client Do-Not-Contact List then the Client Application can stop the message from being sent and issue a report to the client. DNC lists may also be used to keep others from making on-line purchases (of any type), avoid selling to people with bad credit, etc. by checking before granting access to a site and before soliciting.

Figure 12:
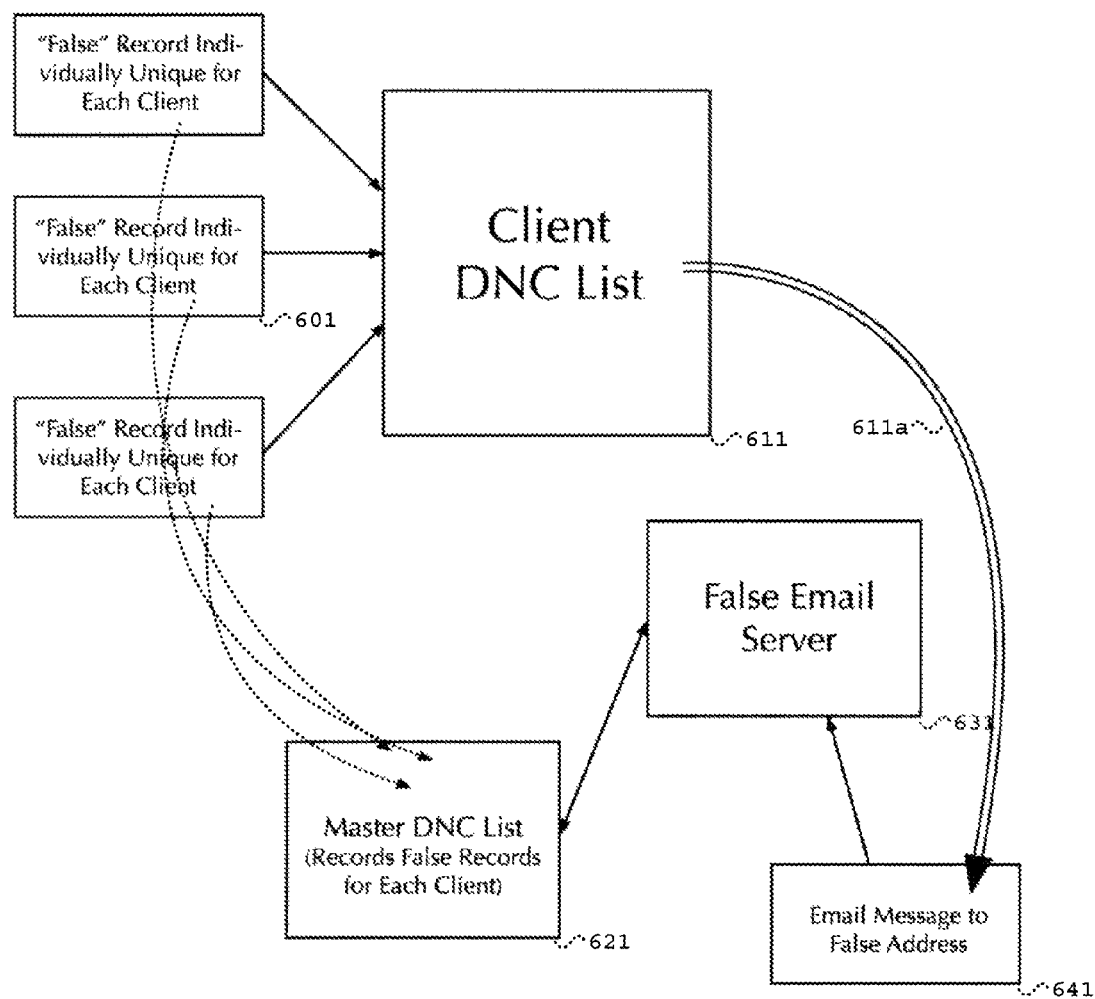
FIG. 12 is a block diagram illustrating the use of false addresses or records to protect a do-not-contact list from being compromised according to one embodiment of the invention.

FIG. 12 is a block diagram illustrating the use of false addresses or records to protect a do-not-contact list from being compromised according to one embodiment of the invention. In FIG. 12, false records are created (601). Under the embodiment of a DNE list, these records can be e-mail addresses that point to an e-mail account not used for any real e-mail. Each Client Do-Not-Contact List can be seeded with individually marked false e-mail addresses (611). The Master Do-Not-Contact List can record which false entries are sent to which Client Applications (621). The false addresses can be monitored by a specifically configured e-mail server (631). E-mail received by the server serves as an indication the DNE list may have been compromised (641). The client whose do-not-contact list contained the false record can be investigated for potential liability. While mathematically nearly impossible to run a one-way hash in reverse and discover the original value, it may be possible to attack a DNE list by simply guessing different addresses, hashing each, and seeing if any resulting hashes match existing records in the DNE list (611a). However unlikely, using false records as described in FIG. 12 provides additional protection against this type of attack.

In an additional embodiment, an entire category of consumers may be placed in a do-not-contact list. For example, a category such as youth, elderly, age group, nationality, gender, ethnicity, area, city, town, state, county, country, area code, zip code, email address, email provider, internet service provider, school email address provider, library email address provider, government sector email address, etc. Thus, the entries in the do-not-contact list (e.g., the master do-not-contact list or the client do-not-contact list) may be sorted according to category or demographic information as previously discussed. An entry belonging to the category listed in the do-not-contact list would be indicated as an entry of a consumer that should not be contacted. In addition, the entry may be an entry of information of a particular group or category of consumers (as opposed to a particular consumer) and a match of this particular category of consumers against the do-not-contact list would indicate that the entire group or all consumers sharing the particular characteristic or demographic information of the group belongs to the do-not-contact list. Thus, when an entry, either of a particular consumer or of a particular category, that matches a category in the do-not-contact list, that entry belongs to a particular consumer or a particular category of consumer that do not wish to be contacted. Appropriate actions such as reporting, removal, or purging of the entry may be followed as previously described.

ADDITIONAL EMBODIMENTS

While the invention has been described in terms of several embodiments, those skilled in the art will recognize that the invention is not limited to the embodiments described. The method and apparatus of the invention can be practiced with modification and alteration with the spirit and scope of the appended claims. The descriptions provided are thus to be regarded as illustrative instead of limiting on the invention.

What is claimed is:

1. A computer implemented method comprising:
   collecting, by a data collection system, a plurality of contact information of a a plurality of consumers that do not wish to be contacted via the plurality of contact information respectively;
   encrypting, by a one-way hash engine, the plurality of contact information of the collected by the data collection system to generate a plurality of encrypted values of the plurality of contact information to conceal the plurality of contact information;
   storing, by a master do-not-contact list server, the plurality of encrypted values of the plurality of contact information in a master do-not-contact list;

comparing an encrypted value from a client do-not-contact list application of a client machine against the plurality of encrypted values of the master do-not-contact list;

determining that the encrypted value from the client do-not-contact list application matches one of the plurality of encrypted values on the master do-not-contact list; and responsive to the determination that the encrypted value from the client do-not-contact list application matches one of the plurality of encrypted values on the master do-not-contact list, determining that the consumer corresponding to the encrypted value from the client do-not-contact list application should not be contacted via the contact information of the consumer.

2. The method as in claim 1 further comprising:

further responsive to the determination that the encrypted value from the client do-not-contact list application matches one of the plurality of encrypted values on the master do-not-contact list, causing the contact information of the consumer corresponding to that encrypted value to be at least one of automatically purged from a contact list, purged from a client's machine, blocked from entering a contact list, and reported that the contact information of the consumer is on the master do-not-contact list.

3. The method as in claim 1 wherein each of the plurality of contact information of the plurality of consumers includes at least one of an email address, a user identifier, a domain name, an instant message identifier, a telephone number, and an information that identifies an individual communication device or account.

4. The method as in claim 1 wherein each of the plurality of contact information of the plurality of consumers includes demographic information or a category of a set of entries fitting a particular characteristic.

5. A non-revealing do-not-contact system comprising:

a client machine communicable with a master do-not-contact list server;

a do-not-contact list client application of the client machine configured to receive a set of one or more unique hashed values from the master do-not-contact list server that have been generated by a hashing of a respective one of a set of one or more contact information of one or more consumers collected by a data collection system and transferred to the master do-not-contact list server, and wherein each one of the set of unique hashed values are hashed in a manner such that the respective contact information is concealed, and wherein the one or more consumers do not wish to be contacted via the one or more contact information respectively;

wherein the client machine includes a storage to store a client do-not contact list, wherein the client do-not contact list is to include the set of unique hashed values received from the master do-not-contact list server;

wherein the do-not-contact list application of the client machine is further configured to:

hash a client contact information to generate a client hash value;

compare the client hash value with the set of unique hashed values of the client do-not-contact list to determine whether the client hash value is included on the client do-not-contact list; and determine to not make contact via the client contact information upon a determination that the client hash value is included on the client do-not-contact list.

6. The system as in claim 4, further comprising:

a master do-not-contact list database communicable with the master do-not-contact list server to store the unique hashed values for the master do-not-contact list server.

7. The system as in claim 5 wherein each respective one of the set of unique hash values is further associated with consumer demographic information and wherein the hashed client entry associates with consumer demographic information.

8. The system as in claim 5 wherein the do-not-contact list client application is deployed on multiple remote computers of at least one of individuals, businesses, and clients, that send unsolicited communications or store or use the contact information of the one or more consumers.

9. A method comprising:

causing, by a do-not-contact list client application of a client machine, a contact information of a first consumer to be hashed by a first one-way hash engine to convert the contact information of the first consumer into a hashed client contact entry;

causing, by the do-not-contact list client application of the client machine, the hashed client contact entry to be compared against a client do-not-contact list, wherein the client do-not-contact list is created at least partially by using a set of one or more hashed values retrieved through a master do-not-contact list server that were collected by a data collection system and hashed by a second one-way hash engine communicable with the data collection system and transferred to the master do-not-contact list server, the set of hashed values representing a set of one or more contact information of consumers who do not wish to be contacted, and wherein the set of hashed values are hashed in a manner that conceals the set of contact information respectively;

determining, by the do-not-contact list client application of the client machine, that the hashed client contact entry matches one of the set of hashed values on the client do-not-contact list retrieved through the master do-not-contact list server; and determining, by the do-not-contact list client application of the client machine, that the first consumer should not be contacted via the contact information in response to the determination that the hashed client contact entry matches one of the set of hashed values on the client do-not-contact list that were retrieved through the master do-not-contact list server.

10. The method as in claim 9 wherein the contact information of the first consumer is collected by the client machine and is hashed by the first one-way hash engine connected to the client machine.

11. The method as in claim 9 wherein the contact information of the first consumer is collected by the client machine, hashed by the one-way hash engine residing in the client machine, and compared to the hashed values retrieved through the master do-not-contact list server on the client machine.

12. The method as in claim 9 further comprises causing the do-not-contact list client application of the client machine to be in communication with the master do-not-contact list server to retrieve at least one hashed value from the master-do-not contact list server to create the client do-not-contact list.

13. The method as in claim 9 further comprises causing the one-way has engine to include at least one one-way hashing scheme being selected from a group consisting of SHA-0, SHA-1, SHA-256, SHA-384, SHA-512, MD2, MD4, MD5, RIPEMD-160, RIPEMD-128/256/320, HAS160, HAS-V, HAVAL, Tiger, Panama, Snefru-2, GOST-Hash, BRS-H1/H20, and Whirlpool.

* * * * *